June 14, 1960     D. M. LAWRENCE ET AL     2,940,698
ROLL AND YAW INTERCONNECTION
Filed June 6, 1955
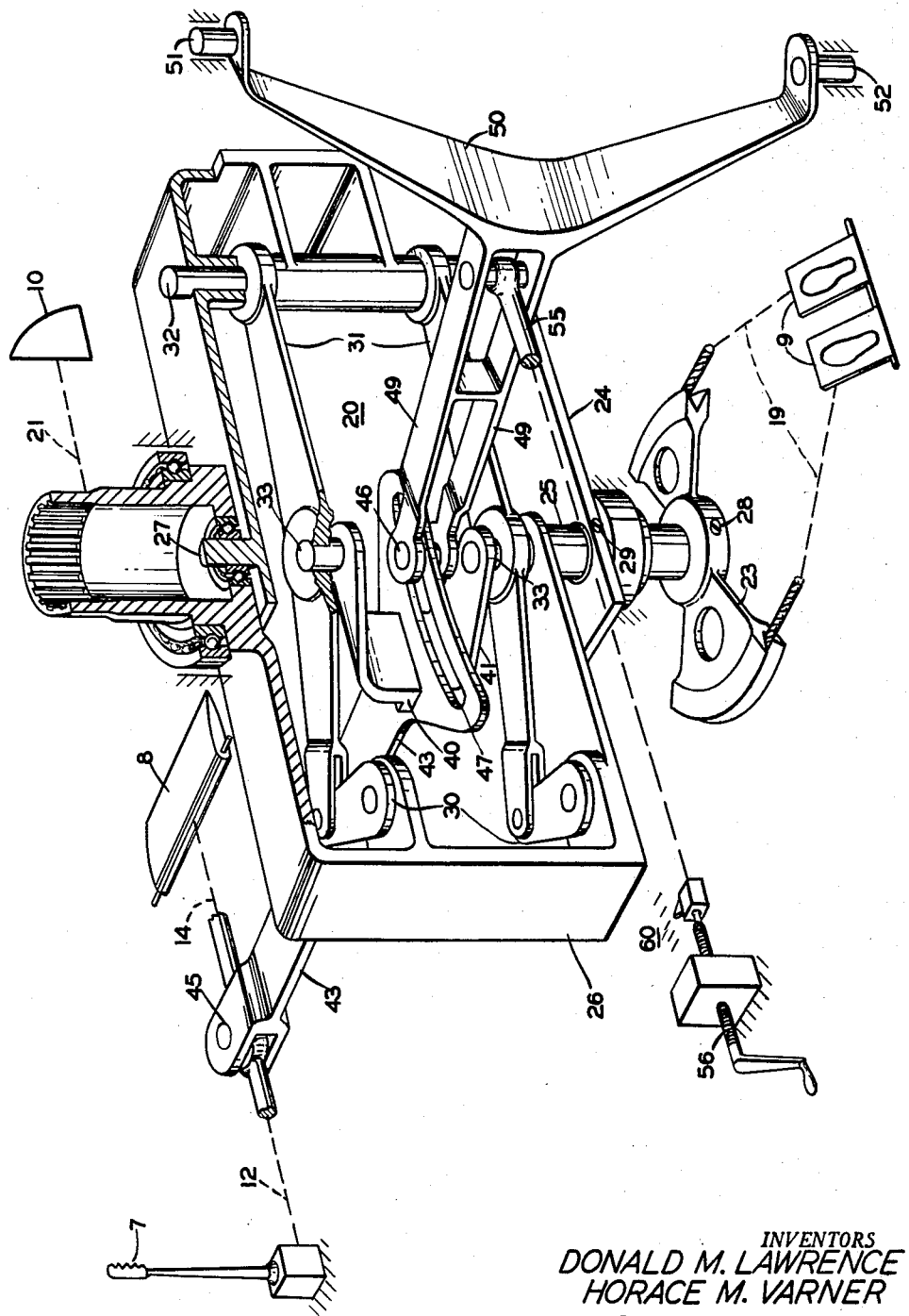
INVENTORS
DONALD M. LAWRENCE
HORACE M. VARNER
BY Oscar B Brumback
ATTORNEY

United States Patent Office
2,940,698
Patented June 14, 1960

2,940,698

ROLL AND YAW INTERCONNECTION

Donald M. Lawrence, Wood-Ridge, and Horace M. Varner, Short Hills, N.J., assignors to Bendix Aviation Corporation, Teterboro, N.J., a corporation of Delaware Filed June 6, 1955, Ser. No. 513,274

4 Claims. (Cl. 244—83)

This invention relates generally to steering systems for aircraft and, more particularly, to a system for controlling the surfaces which maneuver an aircraft about the roll and yaw axes.

When the ailerons or elevons of an aircraft are displaced to bank and turn the craft, the aerodynamic coupling which exists between the yaw and roll axes also causes a yawing effect of the craft. However, this yawing effect at low speeds is not sufficient to give a coordinated turn so a displacement of the rudder surface is necessary to increase the yawing effect to coordinate the turn. At higher speeds, it has been found that the yawing action which is coupled from the rolling action of some aircraft is greater than that required for a coordinated turn; so it is necessary to decrease the yawing action in order to coordinate the turn. In other words, to give a coordinated turn, the rudder must be operated at high speeds in a direction opposite from the direction in which it was operated at low speeds.

An object of the present invention, therefore, is to provide a novel interconnection between the roll and yaw axes so that the pilot can operate the rudder in the same manner for all airspeeds.

Another object is to provide a novel interconnection between the roll and yaw control systems so that the apparent coupling effect between the roll and yaw channels of an aircraft during a turn may be maintained substantially constant for different flying conditions although characteristics of the aerodynamic coupling action of the two channels may be materially changed.

Still another object is to provide a novel interconnection between the roll and yaw control channels of an aircraft so that the application of a roll control effect to the craft also applies to a yaw control effect to the craft.

A further object is to provide a novel interconnection between the roll and yaw control surface actuators so that when the roll control surfaces are actuated the yaw control surfaces are actuated by an amount corresponding to a function of the roll surface actuation as modified by a parameter of flight.

The present invention contemplates a steering system for an aircraft wherein a roll controller is movable to move the roll control surface, a yaw controller is movable to move the yaw control surface, and an interlock provides for the moving of the yaw control surface by the roll controller independently of the movement of the yaw controller, the ratio of movement of the roll controller to movement of the yaw control surface being adjustable as a function of the flight condition of the craft.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

The single sheet of drawing illustrates schematically the novel steering system of the present invention as controlling the ailerons and rudders of an aircraft.

Turning now to the drawing, displacements of a conventional manual control column 7 displace the aileron surface 8 to initiate a turn, and displacements of pedals 9 displace rudder 10 to coordinate the turn. The movements of manual control column 7 are transmitted through conventional linkages 12 and 14 to displace the aileron surface 8 to maneuver the aircraft about the roll axis; and the movements of rudder pedals 9 are transmitted through linkages 19, the novel interconnection device 20 and linkages 21 to the rudder surface 10 to coordinate the turn.

In the novel interconnection device 20, pulley 23 and one housing section 24 are fixed to a shaft 25 by suitable means such as set screws 28 and 29. The other housing section 26 is rotatable on shaft 25 and on a shaft 27 projecting from housing section 24. Shafts 25 and 27 are coaxial.

Housing sections 24 and 26 are further connected by way of a pair of drag links 30 and levers 31. Levers 31 are journaled on a shaft 32 in housing section 24 and are pivoted about shaft 33. Thus, as the pilot kicks rudder pedal 9, he rotates pulley 23 and housing section 24; housing section 24 rotates levers 31 about shafts 33; and links 30 rotate housing section 26 about shaft 25 to displace the rudder surface 10.

At low air speeds, the pilot displaces stick 7 to move aileron 8 to bank the craft; and, to coordinate the turn, kicks a rudder pedal 9 to move rudder 10. Due to the changing characteristics of the aerodynamic coupling which exists between the roll and yaw axes, the movement of the pedal would differ for each flight condition of the craft. In accordance with the present invention, a novel interconnection is provided between the aileron linkage and the rudder linkage so that the aerodynamic coupling between the roll and yaw axes appears to remain constant despite changes in flight condition and the pilot can provide the same rudder coaction for a given roll action.

In accordance with the present invention, shafts 33 are supported by a pair of members 40 and 41 fixed to a member 43. This member 43 is connected by a pin 45 to aileron links 12 and 14 so that movement of the pin 45 rotates member 43 about a pin 46 which rides in a slot 47 in member 43 that is supported by bars 49. The bars are supported on the aircraft by a member 50 which is rotatable about shafts 51 and 52 by a member 55 which is controlled by a jack screw 56. The angular position of member 50 corresponds to a function of a parameter of flight, such as Mach number being shown by indicia 60.

In the operation of the device it will be apparent that when shafts 25, 27, 33 and 46 are coaxial, a movement of controller 7 displaces links 12 and 14 to displace aileron 8, thereby displacing pin 45. This rotates member 43 about shaft 46; but, since shafts 33, 46, 25, and 27 are coaxial, the rotation of members 40 and 41 about shaft 33 does not operate rudder 10. However, as a jack screw 56 is positioned to a high speed position, member 46 will no longer be coaxial with shafts 25 and 27. At this time, the movement of the ailerons causes a rotation of member 43 about shaft 46, and this rotates members 40 and 41 about shaft 46, thereby rotating shaft 33 about shaft 46. This pivots lever 31 about shaft 32 and drags housing 26 about shaft 25. Thus, as the ailerons are moved to roll the craft the rudder is also moved to correct for the additional movement about the yaw axis resulting from the movement about the roll axis, and the coupling effect from the roll to the yaw axis appears to be the same for high and low speeds of the craft.

The foregoing has presented a novel steering system for aircraft by which the coupling action from the roll to yaw channels can appear to be maintained constant for widely changing flight conditions of the craft, so that the pilot can exert the same control action on the control surfaces for high and low air speeds without the necessity of taking into consideration the flight parameters of the craft.

Although only one embodiment of the invention has been illustrated and described in detail, it is to be expressly understood that invention is not limited thereto. Various changes can be made in the design and arrangement of the parts without departing from the spirit and scope of the invention as will now be understood by those skilled in the art.

What is claimed:

1. A control system for an aircraft having movable roll and yaw control surfaces thereon, comprising a first controller, first means for moving said roll control surface upon movement of said controller, a second controller, second means for moving said yaw control surface upon movement of said second controller, said control means including first and second rotatable members, said first member being connected to said second controller and rotatable upon movement of said second controller, said second member being connected to move said yaw control surface upon rotation of said second member, a lever having a pivot and means operatively connecting said lever and members, whereby movement of said first member displaces said lever about its pivot and rotates said second member, and means interconnecting said first and second means including means for moving said pivot upon movement of said first controller whereby said lever pivots about the means operatively connecting the lever with said first member to rotate said second member and said yaw control surface is moved as a function of the movement of said roll control surface by said first controller.

2. A steering system for an aircraft having movable roll and yaw control surfaces thereon, comprising a first controller, first means for moving said roll control surface upon movement of said first controller, a second controller, second means for moving said yaw control surface upon movement of said second contorller, said second means including first and second rotatable members, means for rotating said first member upon movement of said second controller, a lever having a pivot intermediate the opposite ends thereof, and means connecting said lever at the opposite ends thereof to said members so that movement of said first member displaces said lever about its pivot and rotates said second member, the rotation of said second member moving said yaw control surface, means interconnecting said first and second means including linkage means for moving said pivot upon movement of said first controller whereby said lever rotates about the means operatively connecting the lever with said first member to rotate said second member and said yaw control surface is moved as a function of the movement of said roll control surface, and means for adjusting said linkage means so as to vary the ratio of movement of said pivot by said linkage means to movement of said first controller.

3. A steering system for an aircraft having roll and yaw control surfaces thereon, comprising a first mechanical connection for moving said roll control surface, a second mechanical connection for moving said yaw control surface, and means interconnecting said first and second connections, said second connection including a pair of rotatable members, a lever connected to one of said members and having a pivot, a link connecting said lever with the other of said members, whereby rotation of said one member rotates said lever about said pivot to rotate said other member, said other member moving said yaw control surface, and said interconnecting means including a member movable about an axis by said first connection for positioning said pivot thereby rotating said lever about its connection with said one member to rotate said other member, and means for positioning said axis to adjust the ratio of movement of said first connection to said second connection.

4. A steering system for an aircraft having movable roll and yaw control surfaces thereon, comprising a first controller, first means for moving said roll control surface upon movement of said first controller, a second controller, second means for moving said yaw control surface upon movement of said second controller, said second means including first and second rotatable members, means for rotating said first member upon movement of said second controller, a lever having a pivot intermediate the opposite ends thereof, and means operatively connecting said lever at the opposite ends thereof to said members so that movement of said first member displaces said lever about its pivot and rotates said second member, the rotation of said second member moving said yaw control surface, means interconnecting said first and second means including a second lever operatively connected at one end to said first means, means projecting from said second lever for carrying said first-mentioned pivot, a second pivot supporting the second lever at an end opposite from said one end, said second pivot operatively positioned in an eccentric relation to said first-mentioned pivot so that a movement of said second lever may effect a movement of the first-mentioned pivot to operatively position the first-mentioned lever and thereby the yaw control surface as a function of the movement of the roll control surface, means adjustable to vary the operative position of said second pivot relative to said first-mentioned pivot to thereby vary the ratio of movement of said yaw control surface to movement of the roll control surface so as to compensate for aerodynamic conditions prevailing in flight of the aircraft at varying airspeeds, and indicator means cooperating wtih said adjustable means to provide a predetermined indication of the airspeed for which the adjustment thereof provides an effective compensation.

References Cited in the file of this patent

UNITED STATES PATENTS

| | | |
|---|---|---|
| 2,082,172 | Mignet | June 1, 1937 |
| 2,542,946 | Ross | Feb. 20, 1951 |
| 2,601,458 | Robert | June 24, 1952 |
| 2,625,349 | Speer | Jan. 13, 1953 |